(12) United States Patent
Hoenig et al.

(10) Patent No.: US 7,762,806 B2
(45) Date of Patent: Jul. 27, 2010

(54) AFTERBURNER DEVICE AND METHOD FOR OPERATING AN AFTERBURNER DEVICE

(75) Inventors: Guenter Hoenig, Ditzingen (DE); Frank Miller, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 1175 days.

(21) Appl. No.: 10/532,855

(22) PCT Filed: Sep. 3, 2003

(86) PCT No.: PCT/DE03/02918

§ 371 (c)(1),
(2), (4) Date: Oct. 6, 2005

(87) PCT Pub. No.: WO2004/040683

PCT Pub. Date: May 13, 2004

(65) Prior Publication Data

US 2006/0153756 A1 Jul. 13, 2006

(30) Foreign Application Priority Data

Oct. 29, 2002 (DE) ............................... 102 50 360

(51) Int. Cl.
*F23C 9/00* (2006.01)

(52) U.S. Cl. .................. 431/7; 431/6; 431/79; 431/116; 431/170; 431/215

(58) Field of Classification Search ............. 431/6, 431/7, 170, 215, 116, 79
See application file for complete search history.

(56) References Cited

U.S. PATENT DOCUMENTS

| 3,718,506 | A | | 2/1973 | Fischer et al. | |
| 3,898,317 | A | * | 8/1975 | Hemsath et al. | 423/210 |
| 4,995,807 | A | * | 2/1991 | Rampley et al. | 431/9 |
| 5,128,977 | A | | 7/1992 | Danos | |
| 5,433,174 | A | * | 7/1995 | Brady et al. | 122/367.1 |
| 5,932,885 | A | * | 8/1999 | DeBellis et al. | 250/493.1 |
| 6,003,305 | A | * | 12/1999 | Martin et al. | 60/274 |
| 6,422,745 | B1 | * | 7/2002 | Glasheen et al. | 374/131 |
| 6,431,857 | B1 | | 8/2002 | Regemond et al. | |

FOREIGN PATENT DOCUMENTS

| DE | 37 29 683 | 3/1989 |
| DE | 197 10 264 | 9/1998 |
| DE | 197 53 249 | 6/1999 |
| EP | 0 468 700 | 1/1992 |
| EP | 0 524 736 | 1/1993 |
| EP | 0 629 432 | 12/1994 |
| JP | 61149711 A * | 7/1986 |
| JP | 55502330 | 4/1993 |
| JP | 6506765 | 7/1993 |
| WO | WO 9301446 | 1/1993 |

* cited by examiner

*Primary Examiner*—Kenneth B Rinehart
*Assistant Examiner*—Daniel A Bernstein
(74) *Attorney, Agent, or Firm*—Kenyon & Kenyon LLP

(57) ABSTRACT

An afterburner device and a method for operating an afterburner device, especially for chemical reformers for obtaining hydrogen, for making heat available from fuels and/or residual gases from a reforming process and/or a fuel cell process. In this context, heat is supplied in a controlled manner from recirculated combustion gases to a first housing and/or a combustion chamber situated in it and at least in part filled with heat resistant, open-pored foamed ceramics. The regulation takes place, for instance, based on a temperature recorded in the combustion chamber using an infrared light measurement.

8 Claims, 4 Drawing Sheets

AFTERBURNER DEVICE AND METHOD FOR OPERATING AN AFTERBURNER DEVICE

FIELD OF THE INVENTION

The present invention relates to an afterburner device, and to a method for operating an afterburner device.

BACKGROUND INFORMATION

In fuel cell-supported transportation systems so-called chemical reformers are used for obtaining the required hydrogen from hydrocarbon-containing fuels.

The optimal operating temperature of a chemical reformer is usually far above its surrounding temperature. Particularly in vehicles for personal transportation, this leads to problems. The numerous standstill phases of the vehicle lead to a large number of cold start phases, in which especially the chemical reformer does not function optimally. At very slight load, the reformer also does not, under certain circumstances, achieve the optimal operating temperature by the heat arising in it, or loses it during the operation.

Therefore, particularly in the case of fuel cell supported drive systems having a chemical reformer, it may be of advantage to install afterburner devices which rapidly bring the chemical reformer to operating temperature using the heat produced by it, and/or of using accumulated residual gases thermally.

An afterburner device burns the combustible residual gases, such as residual hydrogen, while forming flames and/or at least partially catalytically, and is thermally coupled to the chemical reformer. However, the heat energy of the combustible residual gases is generally not, by itself, sufficient for making available a sufficiently great heat output. That is why generally, in addition or by itself, fuel is metered into the afterburner device. In this context, the fuel, which is preferably present in liquid form, is injected into a combustion chamber, finely divided, by devices that are costly and subject to error, as a cloud of droplets having a droplet diameter that is as small as possible. The slight droplet diameter is required in order to bring the fuel into contact with oxygen and heat over as large a surface as possible, and in order thus to carry out the combustion process as completely as possible.

In this context, it may be a disadvantage that metering devices for generating a cloud of droplets having a small droplet diameter are very costly, cost intensive and subject to error. The required small droplet diameter is often able to be achieved only by using high fuel pressure, the generation of high pressure requiring a relatively high quantity of power, and in particular, the equipment for generating the pressure requiring much space. In addition, such metering devices usually have very small metering apertures, which, by combustion residues or deposits, change the metering behavior of the metering device in an impermissible and poorly controllable way. Alternatively to, or supportive of the application of high fuel pressure, solutions having air support are known for the fine atomization of the fuel, the fuel or the residual gas being intermingled sufficiently long with air before the combustion. In this connection, the disadvantages are the large space requirement, the control of the air metering that is costly and subject to interference, and the additional energy requirement.

Finally, especially at low power, the danger arises of unexpected extinguishing of the open continually burning flame in the combustion chamber. The heat output of the afterburner device is therefore strongly restricted in the downward direction. Furthermore, there is always required a certain amount of time for shutting off the fuel supply or reigniting the flame. During this time, the fuel and the residual gas are able to collect in the combustion chamber. This negatively influences the reignition, a catalytic converter that may possibly be present may be damaged, and uncombusted fuel and residual gas may escape into the atmosphere. In spite of all the measures named, uncombusted or incompletely combusted portions remain behind in the exhaust gas of the afterburner device, which are, in part, poisonous or chemically aggressive. This leads to increased environmental loading and material loading, and besides all that, the caloric value of the fuel or the residual gas is utilized only incompletely.

SUMMARY

A method according to an example embodiment of the present invention and an afterburner device according to an example embodiment of the present invention, may have the advantage that, because of the metering of fuel onto or into the open-pore, heat resistant foamed ceramics without the application of costly atomization devices for generating the finest fuel drops, a very good fuel distribution takes place in the combustion chamber and in the foamed ceramics. The relatively high contact surface with air oxygen that goes along with this, leads to an almost complete combustion of the fuel and residual gas supplied, and thus to an excellent efficiency and very low pollutant emissions. The demands on the metering device and the fuel nozzle that meter the fuel into the combustion chamber or into the foamed ceramics are very low, since the distribution of the fuel takes place within the foamed ceramics.

Because of the low heat capacity of the foamed ceramics and because of the combustion process that is distributed uniformly and spaciously in the foamed ceramics, the foamed ceramics heat up very rapidly, as a result of which, even after a brief operating duration and possibly occurring brief interruptions of the fuel supply, an externally supplied ignition, such as by spark plugs, is not necessary upon resumption of the fuel supply. The utilization of the exhaust gas heat by the recirculation of the exhaust gases created in the combustion via a recirculating line and a heat exchange channel, which heats with exhaust gas heat the supplied air and/or the combustion chamber and the foamed ceramics, especially during a cold start operation, leads to an abbreviated cold start phase and consequently to an additional reduction of pollutant emissions as well as to an additional improvement in fuel conversion. By recording the combustion speed, it is possible to regulate the recirculated quantity of heat. Thereby it is possible, in the cold start phase, to recirculate the largest measure of heat quantity without generating unfavorable temperatures for the afterburner device or its operation, in response to increasing combustion speed.

It may also be advantageous that the foamed ceramics first accommodates a part of the metered fuel without its being immediately ignited. Rather, a part of the fuel is first distributed in the foamed ceramics, before it is ignited at its surface. Thus, the foamed ceramics are in a position of first storing a certain quantity of fuel. This characteristic, for example, is of advantage in response to the startup of the afterburner device from a cold state and in response to only insufficient external ignition by, for example, a coiled filament, since the fuel is not immediately able to escape uncombusted all the way through the combustion chamber.

Rather, it is stored in the foamed ceramics, and is further available for combustion. Deflagration in the combustion chamber or an enrichment of the fuel/air mixture beyond ignitability are consequently largely avoided.

Furthermore, it may also be of great advantage that the distribution of the fuel primarily takes place automatically, largely independently of the geometrical shaping of the foamed ceramics. This permits a very adaptable placing of the foamed ceramics in the combustion chamber and the afterburner device, so that one may improve, for example, the thermal coupling between foamed ceramics and combustion chamber, or with other elements of the afterburner device.

In addition, the afterburner device according to the present invention has a very large heat output range, which comes about particularly from the possibility of setting very small heat outputs. Because of these very small heat outputs or fuel powers that may be set, it is possible to avoid switching on and off procedures of the afterburner device that are pollutant intensive, material stressing and efficiency lessening, especially in response to load changing procedures that are typical of personal automobile transportation.

In one first advantageous improvement of the method according to an example embodiment of the present invention, the combustion speed is established in the light of a temperature measurement. Especially advantageously, this may be done using a contactless and thus largely wear-free infrared light measurement.

In one additional advantageous development, the quantity of recirculated combustion gases is regulated based on the determined combustion speed.

The method according to the present invention may also advantageously improved by an additional method step which regulates the supply of air, fuel and/or residual gas as a function of the recorded combustion speed. In an additional further refinement the supply of air into the combustion chamber or the air proportion of the fuel/gas-air mixture being increased in order to reduce the temperature in the combustion chamber or in the foamed ceramics.

The method may also advantageously refined if the method also has a method step in which the combustion chamber or the foamed ceramics are electrically heated. Thereby the combustion chamber or the foamed ceramics may, for example, be heated even before the beginning of the cold start phase, whereby the cold start phase of the afterburner device is abbreviated still further. Similarly, in this manner, the respective required ignition energy may be made available, or a required ignition energy may be generated.

The afterburner device may be advantageously refined in that the foamed ceramics are made at least partially of silicon carbide. Silicon carbide is outstandingly heat resistant, an excellent heat conductor and, beyond that, it provides the foamed ceramics with a good mechanical rigidity at a relatively slight thickness. Besides, silicon carbide is a relatively good conductor of electric current. The good electrical conductivity may be utilized for measuring technology purposes, in order, for instance, to determine the temperature via the electrical resistance derived from the current and the voltage, or the combustion procedure may especially be influenced or controlled via the heat effect of the electric current or, in the case of partial load operation, be completely achieved, e.g., during catalytic combustion.

It may also be advantageous if the foamed ceramics are made in an open-pored manner, by so-called reticulation, which may be done, for instance, in a thermal or chemical manner. Thereby a high degree of open porosity may be achieved, and in addition, the pore size may very easily be set in the range of 0.05 mm to 5 mm, during the manufacture of the foamed ceramics.

Preferably, the foamed ceramics are in good heat conductive contact with at least one part of the wall of the combustion chamber or the first housing, since thereby the heat may be passed on rapidly and efficiently to, for instance, the reformer or to a fuel cell. Similarly, the combustion chamber or the foamed ceramics may be heated from the outside by this wall of the combustion chamber or of the first housing, for example, by a recirculated exhaust gas stream, without having the exhaust gas reach into the combustion chamber or the foamed ceramics.

Because of the positioning of heat conducting elements within the first housing, especially also within the foamed ceramics, it is advantageously possible to conduct heat from a relatively hot region into a region that is relatively cool compared to it, especially into the region of air supply or into the region in which the fuel or the residual gas are metered in. Thereby, the cooling effect of the supplied reactants is compensated for and the speed of the reaction, especially in the cold start phase, is increased in the regions mentioned. The speeds of the reactions therefore run uniformly in all regions of the combustion chamber or the foamed ceramics. It is of special advantage if the heat conducting elements are made of metal or a metal-containing alloy, since metals are especially good heat conductors, and also have good mechanical and chemical properties.

Furthermore, it is advantageous to recirculate the heat energy of the hot exhaust gases by a recirculating line and a heat exchange channel to the foamed ceramics or the combustion chamber and/or the supplied air, and thereby to the combustion reaction itself. Thereby the qualitatively lowvalue exhaust gas heat is utilized, especially in cold start phases, in order quickly to increase the speed of combustion, and in order to preheat the reactants or the combustion chamber.

It is also of advantage if a controller regulates or controls the recirculation of the exhaust gases. It is therefore advantageously possible to recirculate hot exhaust gases in a metered way, and thus to adjust the recirculated quantity of heat to the heat demand. In particular, thereby, overheating of the afterburner device is avoided, and the back pressure of the exhaust gas is held as low as possible.

Furthermore, it is advantageous to manufacture the heat exchange channels from cylindrical tubes, since these are cost-effective and easy to process.

BRIEF DESCRIPTION OF THE DRAWINGS

Exemplary embodiments of the present invention are explained in greater detail in the following description and are shown simplified in the figures.

DETAILED DESCRIPTION OF EXAMPLE EMBODIMENTS

Figure 1:
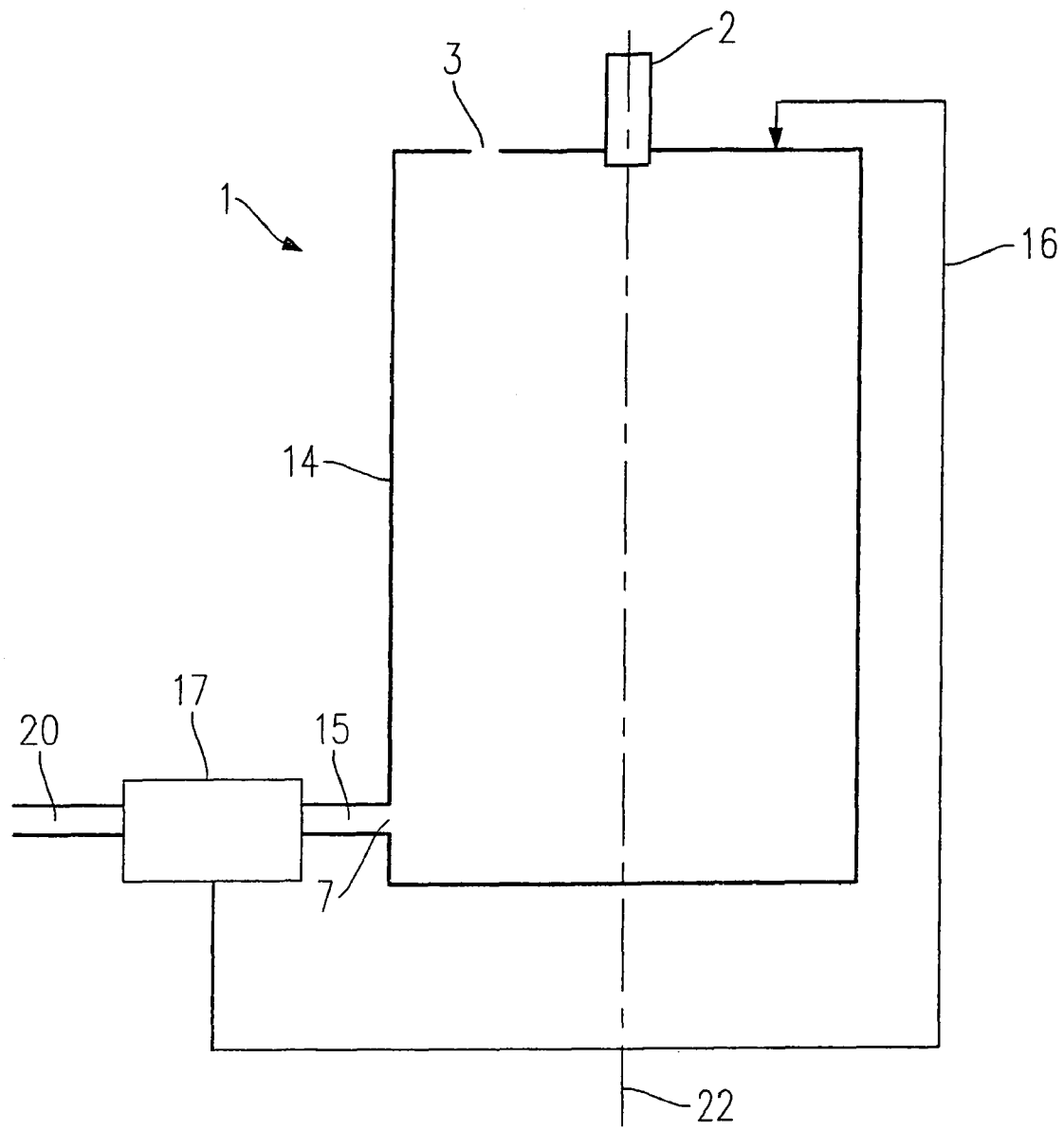
FIG. 1 shows a schematic representation of a first exemplary embodiment of an afterburner device according to the present invention, as a diagrammatic sketch.

In the following, exemplary embodiments of the present invention are described by way of example. The example method according to the present invention is particularly advantageously used on these exemplary embodiments. Identical parts are provided with the same reference numerals in all the figures. The arrows represent the respective fuel and gas flows.

FIG. 1 shows an exemplary embodiment of an afterburner device 1 according to the present invention. The afterburner device has a cylindrical tubular second housing 14 closed at the ends, a nozzle 2, a controller 17 and a recirculating line 16. Nozzle 2 penetrates into the top end face of second housing 14, and is positioned axially centrically to an axis 22, which in this exemplary embodiment is identical to the axis of symmetry of second housing 14. The top end face of second housing 14 also has an air supply 3 which, in this exemplary embodiment, is implemented as just an opening. At the side, close to the lower end of second housing 14, there is a discharge opening 7, which opens out into an outlet pipe 15. Outlet pipe 15, a first exhaust gas line 20 and recirculation line 16 open out into controller 17. Recirculation line 16 leads from controller 17 to the upper end face of second housing 14, and there opens out into second housing 14. In the interior of second housing 14 there is, among other things, a combustion chamber 8, which is not shown in FIG. 1.

The example method of functioning is as follows:

Through nozzle 2, either only fuel in preferably liquid form, only residual gas from, for instance, a reforming process or a fuel cell process, or a mixture of these two cobustible substances is metered into combustion chamber 8, that lies in second housing 14 and is not shown in FIG. 1. The air required for the combustion is aspirated through air supply 3. However, a forced feed of air or other oxygen-containing substances is possible.

The exhaust gases exiting at discharge opening 7 flow through outlet pipe 15 into controller 17, and are recirculated at least in part via recirculation line 16 into second housing 14. The recirculated exhaust gases give off heat energy to the interior of second housing 14, without the recirculated exhaust gases mixing with the fuel, the residual gases or the air, and are conveyed via a first exhaust gas line 19, not shown in FIG. 1, into the environment or into another process. The exhaust gases not recirculated by controller 17 are conducted by controller 17 through a second exhaust gas line 20 into the environment or into another process.

In this exemplary embodiment, the instantaneous temperature or the instantaneous temperature distribution in the interior of second housing 14 or combustion chamber 8, that is not shown, is measured by infrared sensors that are not shown. Thereby one may, in particular, establish the instantaneous speed of combustion in combustion chamber 8. In this exemplary embodiment, as a function of the speed of combustion, the quantity of the exhaust gases recirculated into second housing 14 is regulated. The respective proportions and quantities of air, fuel and residual gases, which reach second housing 14 through nozzle 2 or through air supply 3 are also regulated according to the present invention as a function of the speed of combustion. It is also possible that one might change the respective proportions and quantities of air, fuel and residual gases in a time-controlled manner. Thus, for example, at the beginning of a cold start, overall fewer reactants are supplied and the fuel proportion is increased, at a later point in time, for example, the air proportion being raised, and the quantity of reactants being raised overall. At too high a temperature, according to the present invention, the air supply or the air proportion in combustion chamber 8 is increased.

In addition, a lambda sensor may also be present.

Figure 2:
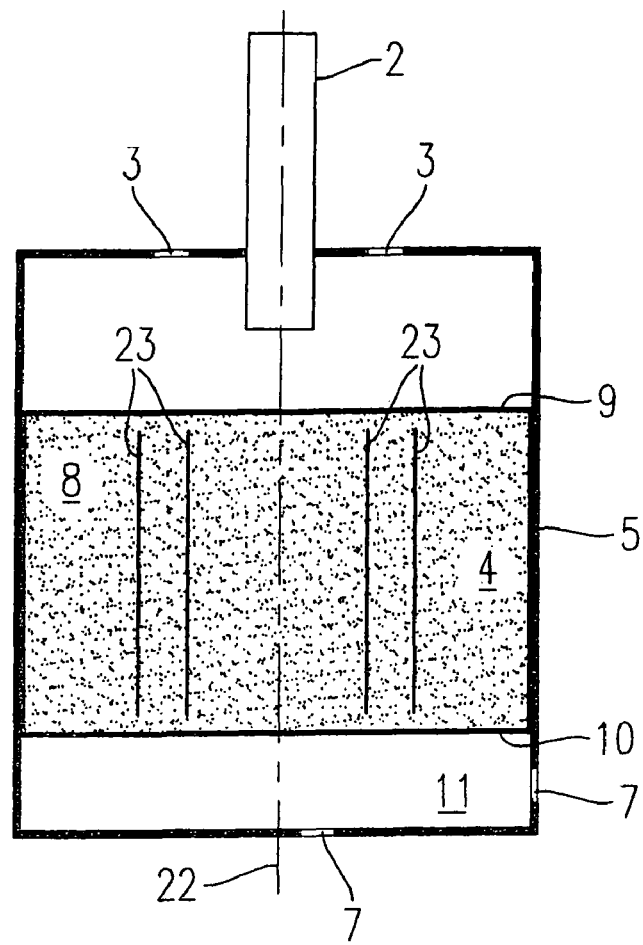
FIG. 2 shows an excerpted schematic representation of a second exemplary embodiment according to the present invention in the region of the combustion chamber.

FIG. 2 shows a schematic representation in excerpted form of a second exemplary embodiment according to the present invention in the region of combustion chamber 8, which is situated in second housing 14 that is not shown in this figure. Combustion chamber 8 is bordered at the side by a cylindrical tubular first housing 5, at the top by an upper ring 9 and at the bottom by a lower ring 10 in housing 5. Upper ring 9 separates combustion chamber 8 from a nozzle 2, and lower ring 10 separates combustion chamber 8 from an outlet chamber 11. Combustion chamber 8 is, in this exemplary embodiment, filled completely with foamed ceramics 4. The pores of the foamed ceramics are connected to one another in the transverse direction and the longitudinal direction, and thus particularly permit an outstanding flow-through and nearly complete combustion. The surface of foamed ceramics 4 is, in this exemplary embodiment, completely coated with a catalytic layer made of CuO.

Figure 3:
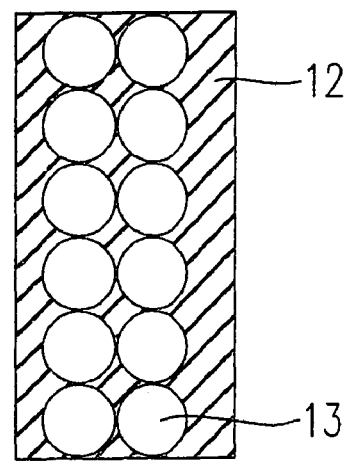
FIG. 3 shows an excerpted section through the open-pored foamed ceramics, as a diagramatic sketch.

An excerpted section is shown in FIG. 3 as a diagrammatic sketch. Pores 13 that are embedded in carrier foam 12 may be recognized there.

The foamed ceramics may be made, for example, by reticulating carrier foam 12, such as polyurethane foam, and subsequent treatment with a silicon carbide suspension, for instance, a ceramic powder made of silicon carbide suspended in water. Nozzle 2 takes up fuel, residual gas, air or a mixture of these components at its axial end facing away from foamed ceramic 4, and meters them in, at its lower axial end facing foamed ceramics 4, through an opening, that is not shown, into foamed ceramics 4. Air is also supplied via an air supply 3 to combustion chamber 8 or to the combustion. Introducing a residual gas/air mixture or a residual gas/oxygen mixture is also possible via air supply 3. Fuel, residual gas or a mixture of these components ignites with air and/or oxygen or reacts chemically in running operation at the hot surface of foamed ceramics 4.

However, the combustion process may also be started or kept going by ignition devices that are not shown. Such ignition devices are, for example, applied as an electrical glow plug or coiled filament between nozzle 2 and foamed ceramics 4. It is also possible to apply the ignition device in foamed ceramics 4. It is also possible to design the ignition device in such a way that the whole foamed ceramics 4, or at least a part of it, is electrically heated in such a way that this forms an ignition device. Finally, foamed ceramics 4 may also be heated from the outside or by installing wires. This makes possible the operation of afterburner device 1 according to the present invention.

After the oxidation of the fuel and/or the residual gas has taken place, the combustion gases escape downwards through lower ring 10 into outlet chamber 11, in order then to escape via discharge openings 7.

First housing 5 is in good heat-conductive contact over a large area with heat exchange channels 18, that are not shown in this figure.

In the interior of foamed ceramics 4, there run strip-shaped heat conducting elements 23. They may also be shaped, for instance, as tubes or cylindrical tubes. In this exemplary embodiment, heat conducting elements 23 run from top to bottom, parallel to axis 22. They are used to transport heat into regions inside first housing 5 which, for example, in a cold start phase, heat up only slowly relative to other regions within first housing 5. In such a way, for example, heat may be conducted from one region near lower ring 10 into a region near upper ring 9. At least a part of heat conducting elements 23 may also penetrate through upper ring 9, and thus, for example, heat the air supplied by air supply 3, and similarly they may penetrate through lower ring 10, in order to conduct away heat energy from the combustion gases. Heat conducting elements 23 should be positioned in such a way that they are not directly acted upon by the fuels metered in through nozzle 2.

Figure 4:
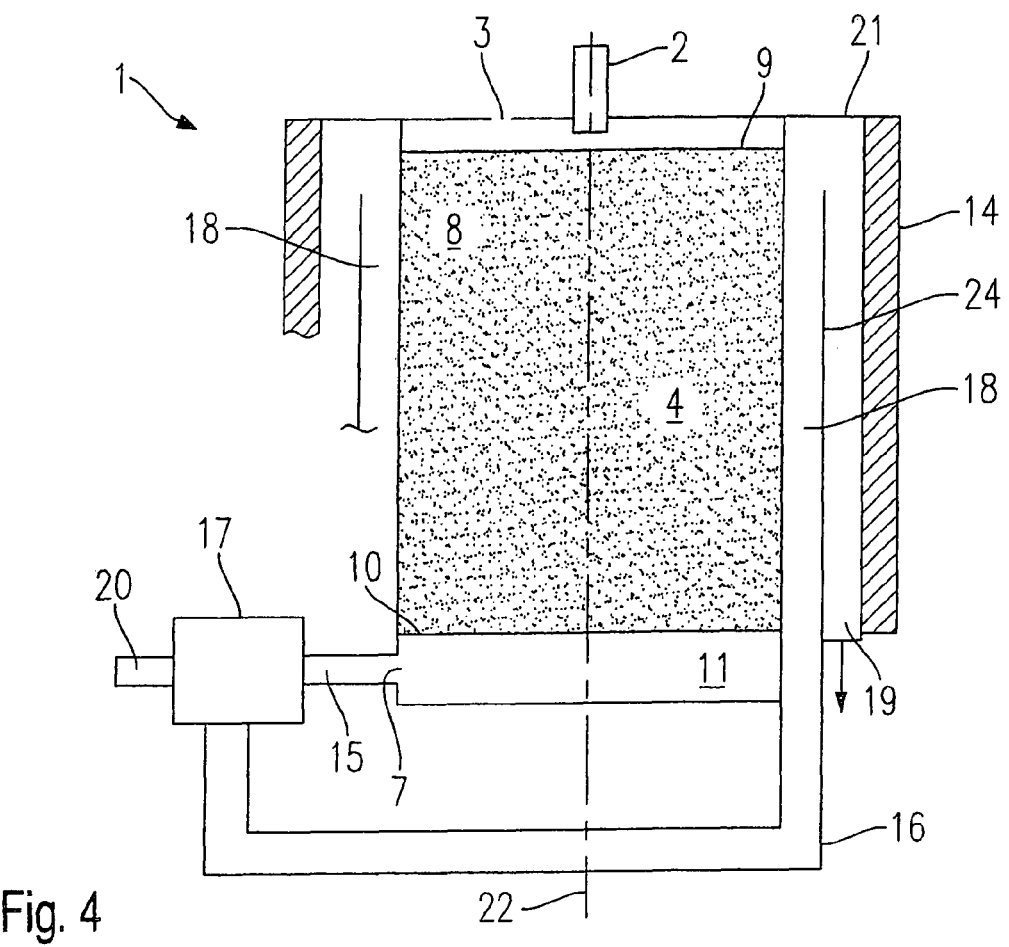
FIG. 4 shows a schematic representation of a third exemplary embodiment according to the present invention.

FIG. 4 shows a third exemplary embodiment according to the present invention that is similar to the exemplary embodiment in FIG. 2. However, this exemplary embodiment additionally has recirculating line 16, which conducts the combustion gases via discharge opening 7, outlet pipe 15 and controller 17 into the lower end of heat exchange channels 18. As may be seen in FIG. 5, heat exchange channels 18, in the exemplary embodiment, of FIGS. 4 and 5 run in one-half of a tube 21 formed as a hollow cylinder that is closed at one end. Tubes 21 run from bottom to top along the lateral wall of first housing 5 and are thermally coupled with combustion chamber 8 and first housing 5. Tube 21 is divided into two halves by a tube wall 24 that divides the tube cross section, the half facing first housing 5 representing heat exchange channel 18, and the half facing away from it representing a first exhaust gas line 19. Tube wall 24 runs to shortly before the closed end of tube 24 in order to create a connection between heat exchange channel 18 and first exhaust gas line 19. Other than that, it hermetically separates the two halves of tube 21. Tubes 21 are distributed radially about first housing 5, at uniform distances. Tubes 21 and first housing 5 are surrounded by second housing 14, the lateral walls of second housing 14 act especially in a heat insulating manner.

Controller 17 determines the quantity of recirculated combustion gases, and conducts them via recirculating line 16 to the lower end of tube 21 into heat exchange channels 18. For example, in a cold start phase, the heat contained in the combustion gases is supplied to first housing 5 and thus to combustion chamber 8 and the chamber lying above the upper ring. The speed of combustion may therefore be accelerated in a cold start phase and thereby the cold start phase may be shortened. In particular, because of the heat supplied, the metered in fuel is able to vaporize more easily and more rapidly. The combustion gases then leave afterburner device 1 via first exhaust gas line 19. The combustion gases that are not recirculated are also conveyed out of afterburner device 1 via a second exhaust gas line 20.

Figure 5:
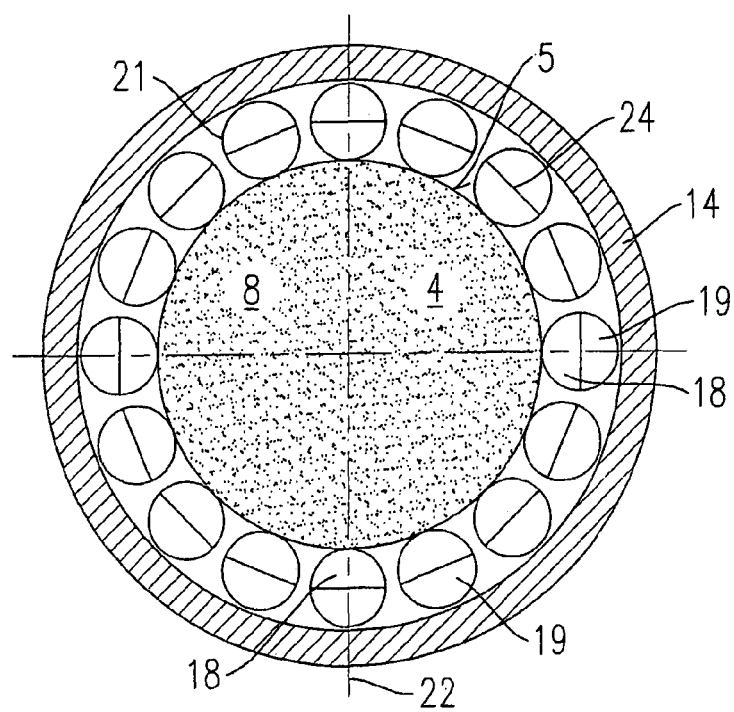
FIG. 5 shows a schematic sectional representation of the third exemplary embodiment, according to the present invention, in a top view.
Figure 6:
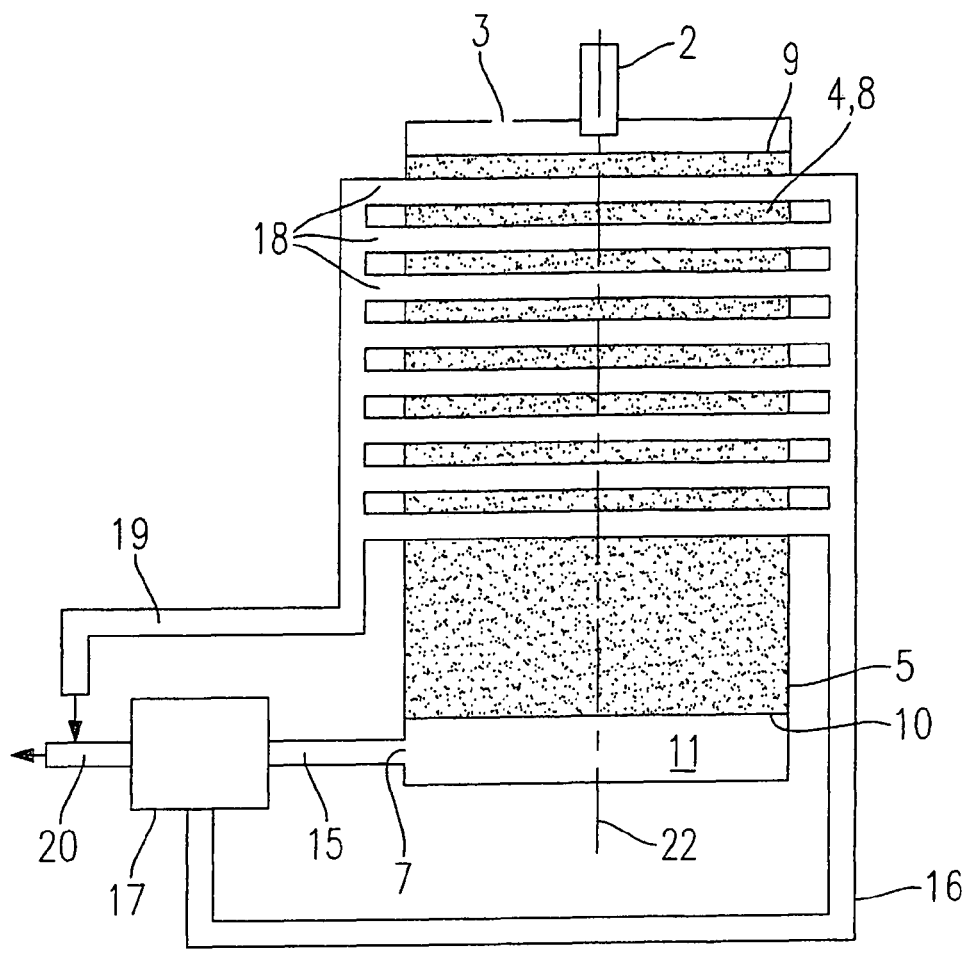
FIG. 6 shows a schematic representation of a fourth exemplary embodiment according to the present invention.

FIG. 6 shows a fourth exemplary embodiment similar to the third exemplary embodiment shown in FIGS. 4 and 5. Recirculating line 16, however, subdivides the recirculated combustion gases into heat exchange channels 18, which run through combustion chamber 8 and foamed ceramics 4. Heat exchange channels 18 are shaped cylindrically tubular; and they run through the lateral walls of first housing 5. A second housing 14 is not present.

Figure 7:
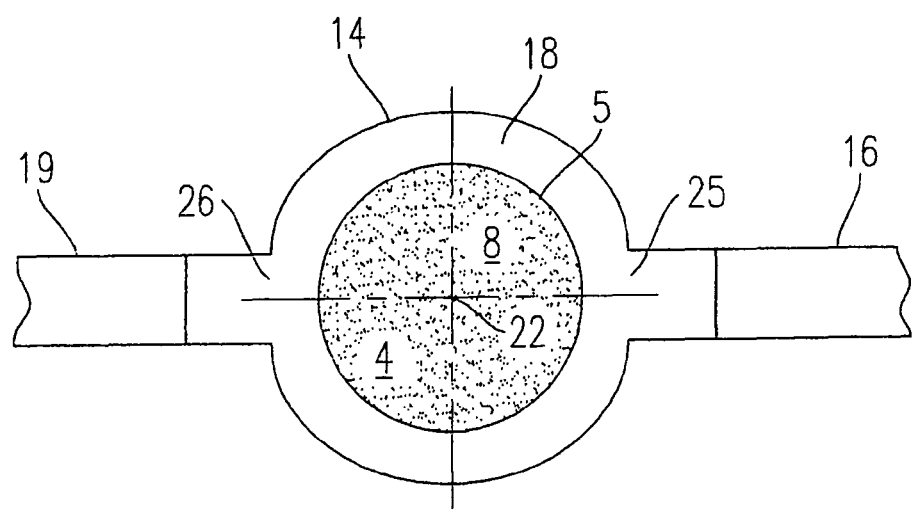
FIG. 7 shows a schematic representation of a fifth exemplary embodiment according to the present invention.

FIG. 7 shows a fifth exemplary embodiment according to the present invention, along with first housing 5 situated in second housing 14. The recirculated combustion gases are guided via recirculating line 16 through a first opening 25 situated in second housing 14, and are guided to a second opening 26 of second housing 14, through heat exchange channel 18 that is formed between the two housings. There, the combustion gases leave afterburner device 1 via first exhaust gas line 19. First housing 5 is hermetically sealed from the recirculated combustion gases, and takes up heat from the recirculated combustion gases, for instance, in a cold start phase. Thereby, combustion chamber 8 and foamed ceramics 4, which are situated in the first housing, are heated up.

What is claimed is:

1. A method for operating an afterburner device for the afterburner device having a nozzle for metering in at least one of fuel, residual gases, and air, into a combustion chamber that is filled at least in part with foamed ceramics, and having a discharge opening for discharging combustion gases, the method comprising:
    recording a speed of combustion in at least one of the combustion chamber and the foamed ceramics;
    recirculating at least a part of the combustion gases to a heat exchange channel that is thermally coupled to at least one of the combustion chamber and the foamed ceramics without the recirculated combustion gases mixing with the fuel, the residual gases, or the air; and
    regulating a quantity of the recirculated combustion gases as a function of the recorded speed of combustion.

2. The method as recited in claim 1, wherein the recording step includes measuring a temperature.

3. The method as recited in claim 2, wherein the temperature is measured via an infrared light measurement.

4. The method as recited in claim 1, wherein the quantity of the recirculated combustion gases is regulated based on the speed of combustion in the at least one of the combustion chamber and the foamed ceramics.

5. The method as recited in claim 1, further comprising:
    regulating a supply of the at least one of the fuel, residual gas, and air, as a function of the recorded speed of combustion.

6. The method as recited in claim 5, wherein at too high a temperature or too great a speed of combustion, a supply of air is increased.

7. The method as recited in claim 1, further comprising:
    electrically heating at least one of the combustion chamber and the foamed ceramics.

8. The method as recited in claim 1, further comprising:
    regulating a proportion of the recirculated combustion gases by changing a quantity of the recirculated combustion gases.

* * * * *